3,562,190
COMPOSITE CASTABLE COMPOSITION
Giffin D. Jones and Burton D. Brubaker, Midland, Mich., assignors to The Dow Chemical Company, Midland, Mich., a corporation of Delaware
No Drawing. Filed Mar. 11, 1968, Ser. No. 711,916
Int. Cl. C08f 47/10; C08j 1/26
U.S. Cl. 260—2.5        11 Claims

ABSTRACT OF THE DISCLOSURE

A moldable, deformable composition of matter comprising (A) solid foamed clay fragments which have closed cell interiors and broken or open cell exteriors intermixed with (B) a settable liquid resin and (C) a liquid readily convertible to a gas at a moderate increase in temperature which composition autogenously sets to a shaped cellular light-weight insulating material and the use of such material to provide thermal insulation.

---

The invention relates to (1) a readily castable novel composition which, when set, is strong, has low permeability to liquids and gas, is only flammable at unusually high temperatures, and offers good resistance against the transfer of heat and (2) use thereof for providing thermal insulation, particularly suitable for covering intricately shaped pipe connections, e.g., steam lines.

Foamed products made of fired or heat-treated clay are known. Similarly foamed glass products including glass blown pellets, which can be crushed and intermixed with an organic binder are known, e.g., as described in U.S. Patent 3,207,588. It is known to use slag pellets in foamed phenolic or polyurethane resin binders. It is also known to admix bulk clay and/or asbestos fibers with such foamed or blown pelletized material and resinous binders.

Such known materials have been unsatisfactory, largely for three reasons: (1) where the ceramic material has been used in the form of pellets with a porous interior and the conventional smooth skin, intermixed with an organic foam, the organic foam does not adhere to the pellets and, due to the differential coefficient of thermal expansion, cracks; (2) where the ceramic material has open pores traversing it, and especially where the pores are fine, i.e., of very small dimension, then the composition shows ultimate low strength and brittleness, and has high porosity manifesting high water absorption and lower thermal insulation; (3) the conventional insulation tends to pull away from the surface of the material covered, thereby greatly decreasing the efficiency and life of the insulation.

The present invention offers marked improvement over heretofore known light-weight thermal insulation. It is durable, highly resistant to conduction of heat, and particularly possesses the property of continued adherence (i.e., good bonding) to the pipe or connection after prolonged usage. (This is largely due to the nature of the clay particles.)

It comprises a mixture of (1) cut or fragmented, previously foamed, solid clay particles having closed cell interior and a rough open cell exterior, i.e., at the cut or fragmented surface, of a size ranging anywhere between about 0.05 square inch to about 1 square inch in cross-section, preferably between about 0.1 and 0.75 square inch, and especially preferred of a size between about 0.25 and 0.50 square inch cross-section; (2) a fluid resin composition (capable of being expanded while fluid), e.g., epoxy resin, novolac resin, epoxy novolac resin, phenol-formaldehyde resin, urea-formaldehyde or melamine-formaldehyde resin, and a hardener therefor; (3) a liquid or solid material at mixing temperature which expands the resin (preferably a liquid) by converting to a gas after a moderate increase in temperature, e.g., a Freon composition or one that yields gas on decomposition, e.g., certain carbonates and bicarbonates. The desired temperature for set is usually from 10° C. to 100° C. although 20° to 70° is preferred. It is important that the solid clay fragments or chips of clay foam employed be made from foam which has a closed cell interior but open cell surface. The induction time (period between admixture of a catalyst in a resin system and noticeable gelation) can be shortened by the application of heat or lengthened by extracting heat as by chilling the liquid resin, preferably prior to admixing the foaming agent.

Where the object to be insulated is a pipe or vessel, it is not difficult to initiate the foaming process by applying heat to the interior. An induction time just long enough to load the cavity is desirable. When a novolac resin is used, some heat above room temperature is necessary for cure. At least about 20 minutes setting time, in general, is usually observed. 0.5 to 2 hours is common.

The closed cell ceramic material, for subsequent fragmenting, cutting, or sawing into suitable size pieces for use in the practice of the invention may be made by following the general direction of U.S. Patents, e.g., 3,056,184 or 3,174,870. Column 2, lines 39 to 71 and claim 1 of 3,056,184 or Example 1 and claim 1 of 3,174,870 are illustrative.

Foamed clay is preferable to use, in the practice of the invention, to foamed glass because of the superior resistance of the clay to thermal shock.

Phenolic resin, when used, can be prepared by any one of the known methods of preparing phenolic resins, e.g. as described in High Temperature Plastics by Brenner, Lum & Riley, pages 53 to 87, or in Phenolic Resins by Gould, both published by Reinhold Publishers, New York, or in Phenoplasts by Carswell, especially pages 6 to 43, published by Interscience Publishers, New York.

The foaming agent is one or more of compounds boiling between about 20° C. and about 70° C. of which a Freon, a hydrocarbon, or a mono- or dichlorinated hydrocarbon are recommended.

The following examples exemplify a practice of the invention.

EXAMPLE 1

A mold provided with a removable top was positioned about an elbow forming a joint between connecting pieces of pipe. A moldable composition was prepared as follows: 25 grams of clay foam fragments prepared substantially as set out in U.S. Patent 3,056,184, having an average cross-sectional area of about 0.5 square inch, were placed in a mold positioned about the elbow and connecting pipe. A mixture of 25 grams of a phenol-formaldehyde resole type resin containing, in intimate admixture therewith, 2.6 milliliters of a 1:1 weight ratio of ethyleneglycol and 37 percent by weight aqueous HCl (as a hardening agent), and also containing uniformly dispersed therein 2.7 milliliters of Freon 11 ($CFCl_3$) as an expanding or blowing agent, was prepared. The resulting mixture in an amount equal to about 0.06 gram per cubic centimeter of the mold cavity was chilled to 15° C. and then poured into the mold which was positioned about the elbow and connecting pipe. There was then added to the resin in the mold that amount of the fragmented ceramic foam which was adequate to fill the mold to the desired extent, allowing space for subsequent expansion as the blowing agent became effective. The top of the mold was then fixed into position. The resin thereafter foamed to fill completely the mold space and set to a solid cellular light-weight thermally insulating composition. The foam so made had a density of 9.5 pounds per cubic foot. The mold was thereafter removed and the pipe placed in continuous service for two months, while 385 p.s.i.g. steam (of at least 200° C. temperature) was passed continuously therethrough. The transfer (loss) of heat through the insulation so made according to the invention was, during this period, compared to the transfer of heat through an equally thick conventional precast asbestos pipe insulation, for the same period, definitely less. It was definitely cooler than the equal thickness conventional pre-cast asbestos pipe insulation. The insulation provided by the invention remained in excellent condition (except as to some discoloration where it was in contact with the pipe).

EXAMPLE 2

This example was conducted similarly to Example 1 but employed, instead of the phenol-formaldehyde resole resin, 11 grams of DER 334 which is an epoxy resin prepared gy reacting about two moles of epichlorohydrin per mole of isopropylidenediphenol in the presence of aqueous NaOH to yield a glycidyl ether having an epoxy equivalent weight of from 178 to 186 and a viscosity at 25° C. of from 500 to 700 cps., in admixture with 4 grams of an epoxy resin hardener which consists essentially of: a polyamide of the general class having the generic formula:

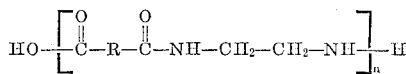

wherein $n$ is from 5 to 15.

Instead of the Freon blowing agent (employed in Example 1), there was employed 4 grams of Marblette Agent 1101 which is a commercially available blowing agent which releases nitrogen gas at a temperature above room temperature (i.e., above about 25° C.). There was also present about one gram of precipitated $CaCO_3$ having a surface area of 0.6 square meter per gram. The particulated or fragmented solid clay foam employed was the same type as that employed in Example 1, but instead of 25 grams, only 21 grams thereof were used. The test was conducted by placing the above moldable uniform mixture into a 7-ounce capacity paper cup, allowing space for the ceramic fragments, and then filling the cup, including all the interspaces among the fragments, to the top with ceramic fragments. The composition was warmed slightly thereby releasing nitrogen gas which caused the resinous portion of the mixture to rise through the ceramic fragments. The cup was thereafter placed in an oven at 84° C. to expedite the curing of the epoxy resin. The resulting composition had a density of about 18.3 pounds per cubic foot. To demonstrate its properties, it was subjected to the same tests employed in Example 1. The higher density made the sample less effective for thermal insulation than that of Example 1, but it showed good thermal insulation properties and displayed exceptional toughness and resistance to tear and deterioration.

Having described our invention, what we claim and desire to protect by Letters Patent is:

1. A moldable, deformable composition of matter comprising (A) cut or fragmented, previously foamed, solid clay particles having closed cell interior and a rough open cell exterior, of an average particle size, ranging between about 0.05 square inch and about 1 square inch in cross-section, admixed with (B) a fluid resin composition selected from the class consisting of epoxy resins, epoxy novolac resins, phenol-formaldehyde resins, urea-formaldehyde resins, and melamine-formaldehyde resins, and mixtures thereof in admixture therewith of a hardener therefor which converts the resin autogenously to a bonding solid; (C) a foaming agent which is liquid or solid at mixing temperature which subsequently converts to a gas after a moderate increase in temperature expanding the mixture of Component A and Component B and creates open cells therein to provide a shaped light-weight insulating material having low thermal conductivity properties.

2. The set solid article which results from the moldable, deformable composition of matter of claim 1 after standing at a temperature of between about 10° C. and about 100° C. at least about 20 minutes.

3. The composition of claim 1 wherein said foaming agent is at least one compound boiling at between about 20° C. and 70° C. selected from the class consisting of a Freon, a hydrocarbon, and mono- and dichlorinated hydrocarbon.

4. The composition of claim 1 wherein said foaming agent is a temperature-sensitive nitrogen gas-releasing compound.

5. The composition of claim 1 wherein said foaming agent is a $CO_2$ gas-releasing compound.

6. The composition of claim 1 wherein said particles have a cross-section of between about 0.1 and about 0.75 square inch.

7. The composition of claim 6 wherein said settable liquid resin is a phenolic resin.

8. The method of providing improved heat insulation about pipe lines and connections comprising (1) forming a mold about said pipe or connection having an opening near the top thereof, (2) putting into said mold the composition of claim 1, closing said opening except for a vent, and allowing the composition to set to a light-weight solid.

9. The method according to claim 8 wherein heat is applied to accelerate the setting rate.

10. The method according to claim 8 wherein the composition is chilled to retard the setting rate.

11. The method according to claim 8 wherein the solid foamed clay particles are placed in the mold to make good contact with the pipe or connection and the liquid resin is admixed therewith later.

References Cited

UNITED STATES PATENTS

| | | | |
|---|---|---|---|
| 2,676,892 | 4/1954 | McLaughlin | 260—2.5B |
| 2,958,905 | 11/1960 | Newberg et al. | 260—2.5B |
| 2,959,508 | 11/1960 | Graham et al. | 260—2.5B |
| 3,056,184 | 10/1962 | Blaha | 161—168 |
| 3,174,870 | 3/1965 | Connelly et al. | 264—44 |
| 3,256,218 | 6/1966 | Knox | 260—2.5A |

MURRAY TILLMAN, Primary Examiner

M. FOELAK, Assistant Examiner

U.S. Cl. X.R.

106—40; 252—318; 260—37, 38, 39